United States Patent Office 3,392,509
Patented July 16, 1968

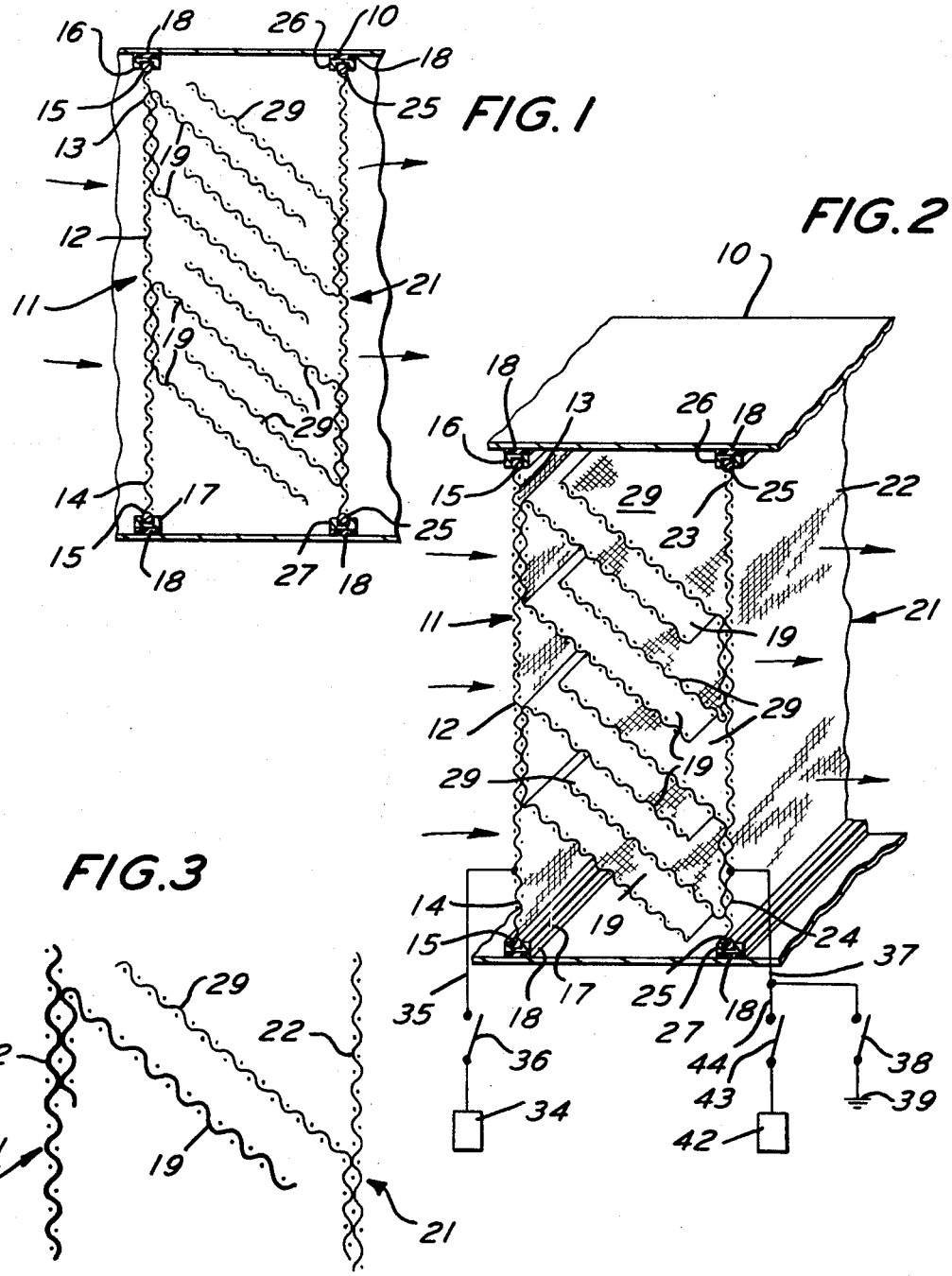

3,392,509
ELECTRIC DUST, SMOKE AND ODOR
CONTROL SYSTEM
Michael H. Pelosi, Jr., Broomall, Pa., assignor to CRS Industries, Inc., Philadelphia, Pa., a corporation of Pennsylvania
Continuation-in-part of application Ser. No. 235,943 Nov. 7, 1962. This application Mar. 22, 1966, Ser. No. 536,379
4 Claims. (Cl. 55—123)

ABSTRACT OF THE DISCLOSURE

An apparatus for controlling the effects of contaminating particles such as dust, smoke and odors in a gas stream. Two porous finned electrodes are spaced apart one electrode is conneced to a source of high voltage pulsating direct current and the other of said electrodes is connected to a radio frequency power source.

---

This application is a continuation in part of my prior application filed Nov. 7, 1962, Ser. No. 235,943, now abandoned for Electric Dust, Smoke and Odor Control System.

This invention relates to electrical apparatus, for utilizing electrostatic fields, pulsating electric fields, and/or high frequency alternating current power to control or neutralize the effects of suspended airborne particulate matter, including dust, smoke and odors, upon occupied building spaces and air conditioning ducts and equipment.

Heretofore electrostatic precipitators and mechanical apparatus of various types have been used to remove gas-borne particulate matter from a gas stream, to chemically absorb odors from a gas stream, to mask odors in a gas stream by introducing other odors and to incinerate or oxidize particulates and odors in a gas stream. Although one or more of these phenomena may be present to a small degree, it is the primary purpose of this invention to control the undesirable effects of gas-borne particles, smoke and odors without many of the disadvantages of prior apparatus and methods in which the primary purpose was precipitation for removal. These disadvantages include the necessity for removal of the collected matter, constant and/or expensive maintenance, expensive replacement or reactivation of components, high operating costs, and undesirable side effects.

The present invention does not use electrostatic precipitation principles but rather utilizes electrical forces in a unique and non-ionizing manner to alter the electrical characteristics of various gas-borne matter by removing or neutralizing the predominant electrical charges carried by this matter. The charges so affected may be dielectric surface charges, or, in the case of some odors and gaseous matter, may be the valence charges associated with the molecular structure. The present invention is mainly concerned with a specific apparatus for utilizing this phenomenon as hereinafter set forth.

It is the principal object of the present invention to provide improved apparatus to eliminate the effects of dust, smoke and odors upon the occupied spaces served by an airstream.

It is a further object of the present invention to provide improved apparatus to eliminate dust, smoke and odor from a gas stream without creating undesirable side effects, such as any ozone content, toxic components, and damming up and sudden release of collected waste products.

It is a further object of the present invention to provide improved apparatus to eliminate the effects of dust, smoke and odor in a gas stream by altering the electrical characteristics of the entrained matter.

It is a further object of the present invention to eliminate the staining effects of airborne dust and smoke in a building by removing or neutralizing the electrical charges which exist within or on the dust and smoke.

It is a further object of the present invention to provide apparatus for air treatment to prevent or reduce the build-up of electric space charge and surface static electricity in a building space or within a cabinet by removing or neutralizing the electrical charges within or upon the airborne dust and smoke within or entering the space or cabinet.

It is a further object of the present invention to provide apparatus for air treatment to prevent or reduce the build-up of dirt within ducts and on equipment within the ducts which carry air to a building space by removing or neutralizing the electrical charges within or upon the airborne particulate matter in the duct.

It is a further object of the present invention to provide apparatus for air treatment to reduce the number or harmful effects of airborne bacteria by altering the electrical characteristics of the bacteria and airborne dust in an air stream.

It is a further object of the present invention to provide apparatus employing perforated electrodes of unique character to which are supplied various combinations of high direct current potential, pulsating high voltage potentials, radio frequency energy, and ground potentials.

It is a further object of the present invention to provide apparatus employing two perforated electrodes, of unique character, in which the physical thickness of one electrode is greater than that of the other.

It is a further object of the present invention to provide apparatus employing two perforated electrodes, of unique character, at least one of which may be advantageously covered with a very thin coating of dielectric insulating material.

It is a further object of the present invention to provide apparatus utilizing a plurality of electrodes perpendicular to the direction of flow of the air to be treated and to each of which there are attached perforate angularly disposed alternately interleaved spaced fins.

It is a further object of the present invention to provide an electrode system of the character aforesaid in which each electrode is mounted in a suitably insulated support so that it may be inserted or removed independently of and without physical interference with the other electrode.

Other objects and advantageous features of the invention will be apparent from the description and claims.

The nature and characteristic features of the invention will be more readily understood from the following description taken in connection with the accompanying drawings forming part thereof, in which:

FIGURE 1 is a side elevational view of a simplified form of the invention;

FIG. 2 is a fragmentary perspective view of the system in accordance with the invention and showing diagrammatically the supply connections; and FIG. 3 is an enlarged fragmentary perspectivve view showing the different thickness of the electrodes in accordance with one embodiment of the invention.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to FIGS. 1 and 2 of the drawings, the basic form of the invention is there illustrated and can be employed at any desired location such as within an outer gas duct 10 of any desired shape. Within the duct 10, and in intersecting relation to the direction of flow of a gas stream an electrode 11 is provided which includes a substantially flat foraminous or perforate screen section 12 extending between an opposite pair of walls of the duct 10, such as upper and lower walls. The screen section 12 in the other direction, such as between opposite side walls, can be of appropriate dimension to extend therebetween but preferably without making electrical contact therewith.

The margins of the screen section 12, shown as upper and lower margins 13 and 14 preferably comprise rods 15 slidable in opposed tracks or channels 16 and 17. The tracks or channels 16 and 17 are suitably supported by electrical dielectric insulators 18, preferably transversely disposed on opposite walls of the duct 10.

The electrode 11 is preferably provided with a plurality of substantially flat parallel angularly disposed elongated fins 19 secured to and extending from the screen section 12 to increase the likelihood of contact therewith of particulate matter carried in the gas stream.

The angular disposition of the fins 19 with respect to the screen section 12 can be varied but is preferably at an angle in the range between 20° and less than 90° with respect to the screen section 12 to maintain gas flow through rather than across the fins 19 and for purposes of illustration the fins 19 are shown as downwardly inclined.

Another electrode 21 is provided which includes a substantially flat foraminous or perforate screen section 22 parallel to the screen section 12, with margins 23 and 24 which preferably comprise rods 25 slidable in opposed tracks or channels 26 and 27. The tracks or channels 26 and 27 are suitably supported by electrical dielectric insulators 18, as before.

The electrode 21 is preferably provided with a plurality of substantially flat parallel angularly disposed elongated fins 29 secured to and extending from the screen section 22, parallel to and spaced from the fins 19 and terminating at their free margins in spaced relation to the screen section 12. The angular disposition of the fins 29 with respect to the screen section 22 is correlated to the disposition of the fins 19 and with the fins 19 disposed downwardly inclined the fins 29 will be upwardly inclined.

The termini of the free margins of the fins 19 are preferably spaced from the screen section 22 substantially the same distance as the spacing between the fins 19 and 29 and the termini of the fins 29 are similarly spaced with respect to the screen section 12.

The electrodes 11 and 21 can be of any desired electric conducting material, such as open mesh woven wire cloth, individual thin rods in parallel and/or intersecting and secured relation and made of electrical conducting material, sheet metal material which has a multiplicity of perforations, or other suitable structure, providing a foraminous of perforate electrode, which will allow the passage of gas across itself. The spacing between the screen sections 12 and 22 and between the fins 19 and 29 is dependent upon electrical connections to be described and voltages which are used in any particular case and also upon the thickness of the specific material of which the electrodes 11 and 21 are made and whether any or all the electrodes are coated with a dielectric material to be described. Merely by way of particular illustration, the electrode 11 may consist of seventeen gauge woven wire cloth while the electrode 21 may consist of twenty-two gauge woven wire cloth.

The electrodes 11 and 21 are made in such manner as to avoid any ionizing effect under the influence of electrostatic fields and for this purpose all edges are smooth, sharp points are avoided as are small radii of curvature.

In one preferred form of the invention, a source of high voltage direct current potential 34 is connected by the conductor 35 through a switch 36 to the electrode 11 while the electrode 21 is connected by a conductor 37 through switch 38 to a ground source 39. The power supply for the source 34 herein referred to may be of relatively simple construction, and capable of supplying potentials of the order of 20 thousand to 60 thousand volts above ground for the high voltage direct current, the particular voltage used being dependent upon the size of the device, the quantity of gas flow being treated, and/or the concentration of particular matter entrained in the gas stream. As gas carrying particulate matter, dust, smoke or odors passes through the duct 10 it is brought into contact with the electrodes 11 and 21 and their fins 19 and 29 which form a combination of uniform and non-uniform electrical fields due to the applied voltages. When the invention is operated in its simplest form, as just described, the effect of the fields and the voltage applied to the non-ionizing electrodes 11 and 21 is to almost completely remove or neutralize all electrical charges which exist on the entrained particulate matter, dust, smoke or odors. In the case of odors which are present in the gas stream, particularly after two or more passes through the device, the odors are diminished or completely eliminated. When the device is operated as described within the air conditioning or ventilating duct system of an occupied building, the effect is one of drastically reducing or eliminating the staining of walls, ceilings, and furnishings which normally occurs. The explanation for this phenomenon follows.

It is a known fact that all suspended particulate matter, smoke, odors and the like which are found in atmospheric air within or without a building carry varying degrees of electrical charges. These charges are normally surface charges on the discrete particles and occur for various reasons in nature, among the most prominent being exposure to radio-active substances that occur in minute quantities in the earth, exposure to radio-active gases which result from corresponding substances escaping from the earth, radiation by cosmic rays, and various miscellaneous sources such as electrical discharges, friction, electricity, and combustion processes. These charges on an individual particle may be positive, negative or both. In general, within urban areas, it has been established that there is normally a slight excess of positive charges in the atmospheric contamination. When air carrying particulate matter or smoke having these electrical charges enters a building or the ventilating system and then into the occupied spaces, it frequently will pick up additional electrical charges due to sources within the building. The normal result from this contamination within a building is that charged particles will tend to go to grounded surfaces such as the walls, ceilings, and the like, and will build-up in the form of stains or visible dirt. In addition, as these particles contact building surfaces which are not always electrically grounded but have a certain dielectric quality, i.e. plaster walls and ceilings, the dielectric surfaces will gradually build-up a static charge of electricity sufficient to then attract other particles which may already be in the space even though they do not have a charge themselves. The situation described is progressive in that there will be a greater and greater build-up of static electricity on the surfaces and space charge within the air of the occupied space. Normal methods of combating the problem of dirt and stains are to install air filters in the air conditioning system.

While this helps in varying degrees depending on how efficient the filter is, it does not solve the problem or in many cases even eliminate the staining on surfaces. The primary reason for the failure of filters to solve this problem is that the filters can only affect a very small percentage of the total air containing particulate matter within the entire building or space which is being treated. Until the particulate matter is carried through duct work back to the filters, these particles are within the occupied spaces and a large percentage will either go to building surfaces due to their own charge or will be attracted to the building surfaces because of the static charge on the surfaces. The situation is aggravated itself within the building due to sources within the space such as fluorescent lights, rotating machinery which produce friction, large areas of window which admit sunlight and other forms of radiation. All of these items contribute to the build-up of charges on airborne particles which in turn help to build-up static electricity as described. In the use of the apparatus of the present invention, as the airstream carrying particulate matter passes through the device as described and the charges are removed or neutralized, there is a progressive action within the space which is just opposite to that described for normal conditions heretofore encountered. In other words, there is a gradual but steady reduction of the build-up of space charge and static electricity on the surfaces of the room since the apparatus does not permit charged particles to pass through it. In this manner, after a reasonable period of operation, the static electricity on the interior surfaces of the building have been reduced or eliminated to a point where they no longer strongly attract particles of contamination which are already in the space. Also, small particles which get through the filters and are introduced into the room through the ventilation system are not as readily attracted to ground surfaces since they do not themselves have an electrical charge. In the case of odors, such as those associated with smoke and cooking, the same effect applies in that there is no longer a build-up of odor on the surfaces of the building which under normal conditions would remain even after the source of the odor, i.e. smoke, and the like, has been removed. It has also been observed that where there is a light layer of particulate matter on the surface of a building or on the surface of the ventilating ducts prior to the use of the apparatus in accordance with the invention, there will be a gradual diminishing of this layer of contamination as the apparatus described continues to operate. The reason for this phenomenon should be clear from the explanation just given. In many cases the particulate matter which stains walls is held in place due to the electrical forces developed by the static electric charge on the surface. As this static charge is reduced or eliminated, especially in the case of inverted or vertical surfaces, the attached particles will fall away from these surfaces by gravity once the electrical forces which held them originally in place have been removed.

In cases within a gas stream either for an occupied building ventilating system, or in a contaminated exhaust stream such as cooking exhaust ducts, combustion process, flue gases and other industrial exhaust gas streams where there are severe odors and severe concentrations of smoke and fumes, the apparatus in a slightly different form will utilize other combinations of electrical connections.

In another preferred embodiment of the invention, a source of high radio frequency power 42 is connected through switch 43 and conductor 44 to the conductor 37. With the switch 38 open the electrode 21 can have this source 42 connected thereto if desired. The R.F. source 42 can be of relatively simple construction, capable of supplying frequencies of the order of 5000 cycles per second to 300,000 cycles per second, at any desired voltage, 100 to 3000 volts RMS being suitable, the values being dependent upon operating conditions in a particular installation. The R.F. source is one capable of being tuned to accommodate differing capacitances of different electrodes.

If the source 42 is employed, the high voltage source 34 can be increased to supply voltages of the order of 50 or 60 kv. D.C. above ground.

If desired, the source 34 of high voltage can be a pulsating high voltage potential where the actual high voltage value is varied from maximum to almost zero at a frequency of approximately 50 to 200 kilocycles per second. This voltage is a distinct pulsating voltage and not the normal ripple associated with rectified A.C. voltages. With such pulsating voltage the ground potential 39 would be used connected through the switch 38 with switch 43 open.

As previously indicated differing thicknesses of electrodes can advantageously be employed. This variation normally applies to the gauge or diameter of wire which is used to form the electrodes and normally is such that the ratio of thickness of electrode 11 to electrode 21 is approximately 0.2 to 1.0. This ratio depends upon the value of voltages which are applied and the specific gauges of wire which are used and is not necessarily limited to the values given. The basic effect of the differences in electrode thickness as just described is to increase the field intensity by producing areas of greater electrical stress in the vicinity of the thinner electrodes.

The fins 19 and 29, extending from the screen sections 12 and 22 and arranged as shown, permit of utilizing a relatively large area of electrode within a given space while maintaining a field producing relationship between the electrodes and their components.

The electrodes 11 and 21 also provide resistance to air flow which creates some turbulence. More intimate contact between the electrodes and the airborne contaminants is thus obtained.

The electrodes 11 and 21 can be easily installed and removed as desired for inspection and cleaning or repair.

The length and width of the electrodes 11 and 21 can be varied over a wide range of sizes to meet the needs of particular installations.

While the phenomenon described above have been repeatedly observed and confirmed by actual usage and experiment all of the principles involved are not completely understood. It may be observed from the foregoing, however, that I have provided electrical apparatus for eliminating or controlling the effects of contamination in a gas stream, such as dust, smoke, and odors, by altering the electrical characteristics of the entrained matter in the gas stream and by affecting or altering the electrical characteristics of spaces into which the gas stream may be introduced.

I claim:
1. A contamination control device comprising
   a first non-ionizing electrode having a porous screen section,
   a second non-ionizing electrode in spaced relation to said first electrode and having a porous screen section,
   each of said electrodes having a plurality of porous fins attached and extending from each of said screen sections toward the other screen section in parallel and spaced relation to the fins of the other electrode,
   one of said electrodes being connected to a source of high voltage pulsating direct current and the other of said electrodes being connected to a member to provide a difference in potential between said electrodes,
   said other of said electrodes being connected to a radio frequency source,
   said fins being at an angle with respect to the screen section to which it is attached in the range from 20° to less than 90°.
2. A contamination control device as defined in claim 1 in which
   the ratio of the thickness of said one electrode to said other electrode being in the range of from 0.2 to 1.0.
3. A contamination control device as defined in claim 1 in which
   said electrodes are mounted in a housing and are removably mounted with respect to said housing.
4. A contamination control device as defined in claim 3 in which
   said housing has trackways therein electricaly insulated from the housing and said electrodes are slidably mounted in said trackways.

References Cited
UNITED STATES PATENTS

| 895,729 | 8/1908 | Cottrell | 55—101 X |
| 1,344,330 | 6/1920 | Bradley | 55—138 X |

(Other references on following page)

UNITED STATES PATENTS

| | | | |
|---|---|---|---|
| 1,456,044 | 5/1923 | Strong | 55—154 X |
| 1,507,687 | 9/1924 | Schmidt | 55—138 X |
| 2,049,561 | 8/1936 | Grave | 55—123 X |
| 2,086,063 | 7/1937 | Brion et al. | 55—123 |
| 2,275,001 | 3/1942 | Anderson | 55—130 |
| 2,639,781 | 5/1953 | Savitz | 55—129 |
| 2,841,241 | 7/1958 | Eilenberger | 55—155 X |
| 2,898,438 | 8/1959 | Gibson | 55—154 X |
| 2,936,851 | 5/1960 | Cook | 55—131 |
| 2,969,127 | 1/1961 | Cook | 55—131 X |
| 2,978,066 | 4/1961 | Nodolf | 55—155 X |
| 3,040,497 | 6/1962 | Schwab | 55—123 X |
| 3,137,550 | 6/1920 | Fruth | 55—131 |

FOREIGN PATENTS

| | | |
|---|---|---|
| 1,109,084 | 9/1955 | France. |
| 358,109 | 9/1922 | Germany. |
| 372,525 | 3/1923 | Germany. |
| 197,353 | 5/1923 | Great Britain. |

HARRY B. THORNTON, *Primary Examiner.*

D. TALBERT, *Assistant Examiner.*